US011350480B2

United States Patent
Jung et al.

(10) Patent No.: US 11,350,480 B2
(45) Date of Patent: May 31, 2022

(54) METHOD AND APPARATUS FOR PERFORMING EMBEDDED RADIO RESOURCE CONTROL CONNECTION RESUME PROCEDURE IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,606

(22) Filed: May 12, 2020

(65) Prior Publication Data

US 2020/0367310 A1    Nov. 19, 2020

(30) Foreign Application Priority Data

May 14, 2019    (KR) .................. 10-2019-0056163

(51) Int. Cl.
*H04W 76/27*    (2018.01)
*H04W 76/15*    (2018.01)
*H04W 74/08*    (2009.01)

(52) U.S. Cl.
CPC ....... *H04W 76/27* (2018.02); *H04W 74/0833* (2013.01); *H04W 76/15* (2018.02)

(58) Field of Classification Search
CPC . H04W 76/27; H04W 76/15; H04W 74/0833; H04W 48/16
See application file for complete search history.

(56) References Cited

U.S. PATENT DOCUMENTS

| 2018/0213452 | A1   | 7/2018  | Kim et al. |
| 2018/0220486 | A1 * | 8/2018  | Tseng ............... H04W 76/27 |
| 2020/0337108 | A1 * | 10/2020 | Wu ................. H04W 76/27 |
| 2020/0359247 | A1 * | 11/2020 | Yi .................... H04L 5/0048 |
| 2021/0084543 | A1 * | 3/2021  | Wang ............... H04W 12/041 |

FOREIGN PATENT DOCUMENTS

WO    2018031603 A1    2/2018

OTHER PUBLICATIONS

International Search Report and Written Opinion of the International Searching Authority in connection with International Application No. PCT/KR2020/006107 dated Aug. 24, 2020, 10 pages.

(Continued)

Primary Examiner — Walli Z Butt

(57) ABSTRACT

Provided is a method of performing a radio resource control (RRC) connection resume procedure by a user equipment (UE), the method including receiving an RRC release message including suspend configuration information, transiting to an RRC_INACTIVE mode, based on the RRC release message, performing an RRC connection resume procedure with a first base station if a certain condition is satisfied, receiving, from the first base station, an RRC resume message including secondary cell group (SCG) configuration information, and performing a random access procedure with a second base station, based on the SCG configuration information.

16 Claims, 11 Drawing Sheets

(56) References Cited

OTHER PUBLICATIONS

3GPP TS 37.340 V15.5.0 (Mar. 2019), Technical Specification, 3rd Generation Partnership Project; Technical Specification Group Radio Access Network; Evolved Universal Terrestrial Radio Access (E-UTRA) and NR; Multi-connectivity; Stage 2 (Release 15), Mar. 2019, 68 pages.
OPPO, "Resume SCG for MR-DC with 5GC," R2-1903130, 3GPP TSG-RAN2#105bis, Xian, China, Apr. 8-12, 2019, 5 pages.

* cited by examiner

METHOD AND APPARATUS FOR PERFORMING EMBEDDED RADIO RESOURCE CONTROL CONNECTION RESUME PROCEDURE IN WIRELESS COMMUNICATION SYSTEM

CROSS-REFERENCE TO RELATED APPLICATION

This application is based on and claims priority under 35 U.S.C. § 119 to Korean Patent Application No. 10-2019-0056163 filed on May 14, 2019 in the Korean Intellectual Property Office, the disclosure of which is incorporated by reference herein in its entirety.

BACKGROUND

1. Field

The disclosure relates to a method and apparatus for performing a radio resource control (RRC) connection resume procedure in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

A variety of services are providable due to the development of wireless communication systems as described above, and thus a method capable of appropriately providing services is required.

SUMMARY

Provided are an apparatus and method capable of effectively supporting services in a mobile communication system.

Additional aspects will be set forth in part in the description which follows and, in part, will be apparent from the description, or may be learned by practice of the presented embodiments of the disclosure.

According to an embodiment of the disclosure, a method of performing a radio resource control (RRC) connection resume procedure by a user equipment (UE) includes receiving an RRC release message including suspend configuration information, transiting to an RRC_INACTIVE mode, based on the RRC release message, performing an RRC connection resume procedure with a first base station if a certain condition is satisfied, receiving, from the first base station, an RRC resume message including secondary cell group (SCG) configuration information, and performing a random access procedure with a second base station, based on the SCG configuration information.

The SCG configuration information may be provided from the second base station.

The performing of the random access procedure with the second base station, based on the SCG configuration information may include performing the random access procedure, based on an instruction of the first base station.

The performing of the random access procedure with the second base station, based on the SCG configuration information may include reporting failure of the random access procedure to the first base station by using a certain RRC message when the second base station is not found for a certain period of time and thus the random access procedure is not initiated.

The method may further include determining whether channel state information (CSI) of the second base station, connection to which is resumed by the random access procedure, indicates out of range (OOR) or whether reference signal received power (RSRP) of a synchronization signal block (SSB) from the second base station is equal to or less than a certain reference value, and transmitting a measurement report message to the first base station, based on a result of the determination.

At least one of criterion information for determining whether the CSI indicates OOR, or the certain reference value may be included in the RRC resume message.

According to another embodiment of the disclosure, a method of performing a radio resource control (RRC) connection resume procedure by a first base station includes transmitting an RRC release message including suspend configuration information, receiving an RRC resume request message from a user equipment (UE), transmitting, to a second base station, secondary cell group (SCG) configuration information for configuring multi-radio access technology-dual connectivity (MR-DC), receiving a SCG configuration message from the second base station, and transmitting, to the UE based on the SCG configuration message, an RRC resume message including the SCG configuration information.

The method may further include transmitting, to the UE, a message instructing to perform a random access procedure with the second base station.

The method may further include receiving, from the UE, a certain RRC message including information indicating that the second base station is not found for a certain period of time and thus the random access procedure fails.

The method may further include receiving a measurement report message from the UE, and the measurement report message may be received when channel state information (CSI) of the second base station indicates out of range (OOR) or when reference signal received power (RSRP) of a synchronization signal block (SSB) from the second base station is equal to or less than a certain reference value.

According to another embodiment of the disclosure, a user equipment (UE) for performing a radio resource control (RRC) connection resume procedure includes a transceiver, and a processor connected to the transceiver and configured to receive an RRC release message including suspend configuration information, transit to an RRC_INACTIVE mode, based on the RRC release message, perform an RRC connection resume procedure with a first base station if a certain condition is satisfied, receive, from the first base station, an RRC resume message including secondary cell group (SCG) configuration information, and perform a random access procedure with a second base station, based on the SCG configuration information.

The SCG configuration information may be provided from the second base station.

The processor may perform the random access procedure, based on an instruction of the first base station.

The processor may report failure of the random access procedure to the first base station by using a certain RRC message when the second base station is not found for a certain period of time and thus the random access procedure is not initiated.

The processor may determine whether channel state information (CSI) of the second base station, connection to which is resumed by the random access procedure, indicates out of range (OOR) or whether reference signal received power (RSRP) of a synchronization signal block (SSB) from the second base station is equal to or less than a certain reference value, and transmit a measurement report message to the first base station, based on a result of the determination.

At least one of criterion information for determining whether the CSI indicates OOR, or the certain reference value may be included in the RRC resume message.

According to another embodiment of the disclosure, a first base station for performing a radio resource control (RRC) connection resume procedure includes a transceiver, and a processor connected to the transceiver and configured to transmit an RRC release message including suspend configuration information, receive an RRC resume request message from a user equipment (UE), transmit, to a second base station, secondary cell group (SCG) configuration information for configuring multi-radio access technology-dual connectivity (MR-DC), receive a SCG configuration message from the second base station, and transmit, to the UE based on the SCG configuration message, an RRC resume message including the SCG configuration information.

The processor may transmit, to the UE, a message instructing to perform a random access procedure with the second base station.

The processor may receive, from the UE, a certain RRC message including information indicating that the second base station is not found for a certain period of time and thus the random access procedure fails.

The processor may receive a measurement report message from the UE, and the measurement report message may be received when channel state information (CSI) of the second base station indicates out of range (OOR) or when reference signal received power (RSRP) of a synchronization signal block (SSB) from the second base station is equal to or less than a certain reference value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
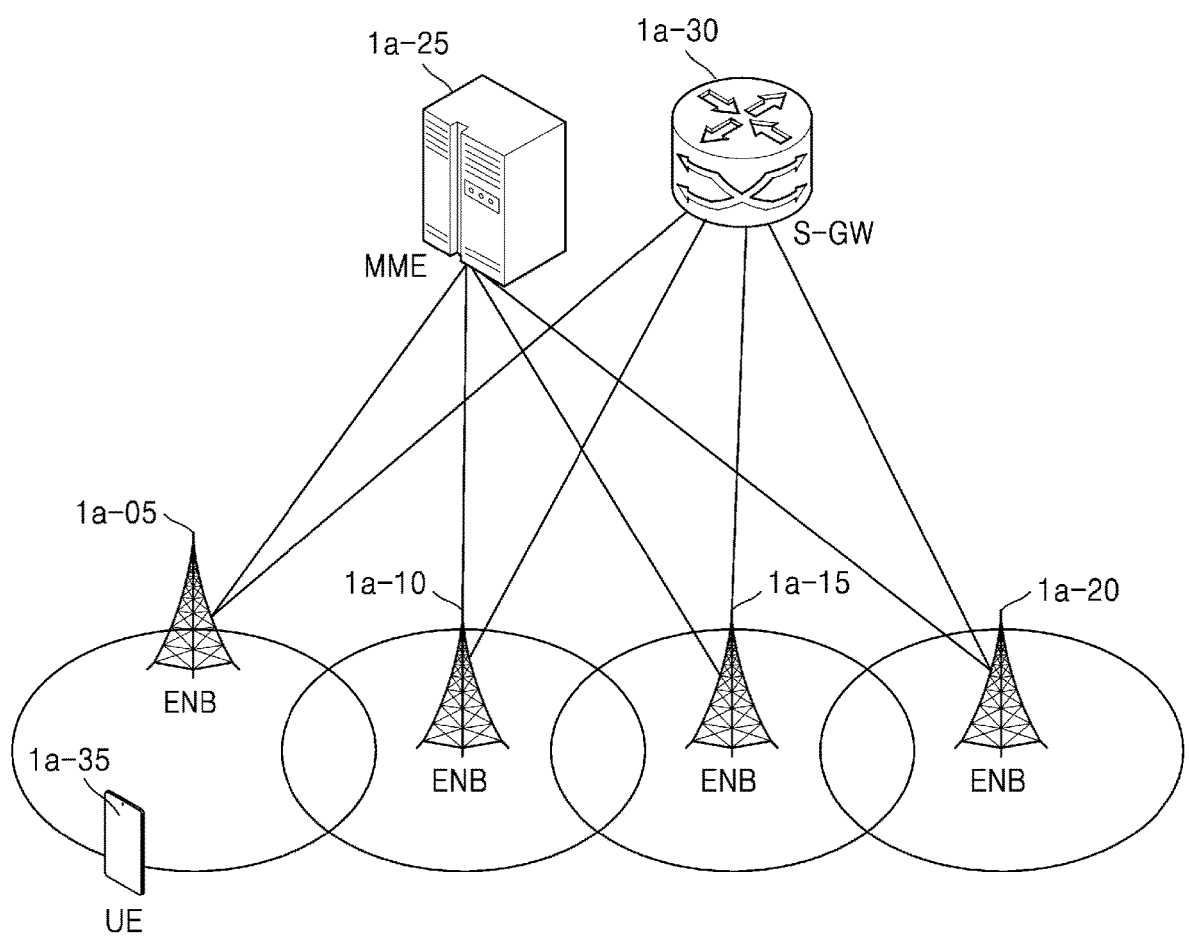
FIG. 1A is a schematic diagram of a long term evolution (LTE) system according to an embodiment of the disclosure.

FIGS. 1A through 1K, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the disclosure will be described in detail by explaining embodiments of the disclosure with reference to the attached drawings. In the following description of the disclosure, a detailed description of known functions and configurations incorporated herein will be omitted when it may make the subject matter of the disclosure unclear. The terms used in the specification are defined in consideration of functions used in the disclosure, and can be changed according to the intent or conventionally used methods of clients, operators, and users. Accordingly, definitions of the terms are understood on the basis of the entire description of the present specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, and a multimedia system capable of performing a communication function.

In the disclosure, a controller may also be referred to as a processor.

In the disclosure, a layer (or a layer apparatus) may also be referred to as an entity.

For the same reasons, elements may be exaggerated, omitted, or schematically illustrated in the drawings. Also, the size of each element does not completely reflect a real size thereof. In the drawings, like reference numerals denote like elements.

One or more embodiments of the disclosure and methods of accomplishing the same may be understood more readily by reference to the following detailed description of the embodiments of the disclosure and the accompanying drawings. The disclosure may, however, be embodied in many different forms and should not be construed as being limited to the embodiments of the disclosure set forth herein; rather, these embodiments of the disclosure are provided so that this disclosure will be thorough and complete, and will fully convey the concept of the embodiments of the disclosure to one of ordinary skill in the art, and the disclosure will only be defined by the appended claims. In the drawings, like reference numerals denote like elements.

It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may produce manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables. Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, the "unit" may include at least one processor.

In the following description of the disclosure, a detailed description of known functions and configurations incorporated herein will be omitted when it may make the subject matter of the disclosure unclear. Hereinafter, the disclosure will be described in detail by explaining embodiments of the disclosure with reference to the attached drawings.

In the following description, terms identifying access nodes, terms indicating network entities, terms indicating messages, terms indicating interfaces between network entities, terms indicating various types of identification information, etc. are merely selected for convenience of explanation. Therefore, the disclosure is not limited to these terms and other terms having technically equivalent meanings may also be used.

To facilitate explanation, the disclosure uses terms and names defined in the $3^{rd}$ Generation Partnership Project (3GPP) long term evolution (LTE) communication standards. However, the disclosure is not limited to these terms and names and may be equally applied to systems conforming to other standards. In the disclosure, the term eNB may be interchangeably used with the term gNB for convenience of explanation. That is, a base station explained as an eNB may also indicate a gNB.

In the following description, a base station is an entity for assigning resources for a user equipment (UE) and may include at least one of a gNode B (gNB), an eNode B (eNB), a Node B (NB), a base station (BS), a radio access unit, a base station controller, or a node on a network. A user equipment may include a user equipment (UE), a mobile station (MS), a cellular phone, a smart phone, a computer, or a multimedia system capable of performing communication functions. However, the base station and the user equipment are not limited to the above-mentioned examples.

In particular, the disclosure is applicable to 3GPP new radio (NR) (or $5^{th}$ generation (5G)) mobile communication standards. The disclosure is applicable to intelligent services (e.g., smart home, smart building, smart city, smart car or connected car, healthcare, digital education, retail trade, security, and safety services) based on 5G communication technologies and Internet of things (IoT)-related technologies. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL), and employs single carrier-frequency division multiple access (SC-FDMA) for an uplink (UL). The UL refers to a radio link for transmitting data or a control signal from a UE (or a MS) to a base station (e.g., an eNB or a BS), and the DL refers to a radio link for transmitting data or a control signal from the base station to the UE. The above-described dual connectivity schemes distinguish between data or control information of different users by assigning time-frequency resources for the data or control information of the users not to overlap each other, i.e., to achieve orthogonality therebetween.

As post-LTE systems, 5G systems need to support services capable of simultaneously reflecting and satisfying various requirements of users, service providers, etc. Services considered for the 5G systems include enhanced mobile broadband (eMBB), massive machine-type communication (mMTC), and ultra-reliability low-latency communication (URLLC) services.

The above-described three services considered for the 5G systems, i.e., the eMBB, URLLC, and mMTC services, may be multiplexed and provided by a single system. In this case, the services may use different transmission and reception schemes and different transmission and reception parameters to satisfy different requirements for the services. The above-described mMTC, URLLC, and eMBB services are merely examples and the types of services to which the disclosure is applicable are not limited thereto.

Although LTE, LTE-A, LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination of one of ordinary skill in the art.

Hereinafter, the disclosure will be described in detail by explaining embodiments of the disclosure with reference to the attached drawings.

FIG. 1A is a schematic diagram of an LTE system according to an embodiment of the disclosure.

Referring to FIG. 1A, a radio access network of the LTE system may include a plurality of evolved nodes B (ENBs) (or nodes B or base stations) 1a-05, 1a-10, 1a-15, and 1a-20, a mobility management entity (MME) 1a-25, and a serving-gateway (S-GW) 1a-30. A user equipment (UE) (or a mobile station) 1a-35 may access an external network via the ENB 1a-05, 1a-10, 1a-15, or 1a-20 and the S-GW 1a-30.

In FIG. 1A, the ENB 1a-05, 1a-10, 1a-15, or 1a-20 may correspond to an existing node B of a universal mobile telecommunications system (UMTS). The ENB 1a-05, 1a-10, 1a-15, or 1a-20 may be connected to the UE 1a-35 through wireless channels and perform complex functions compared to the existing node B. All user traffic data including real-time services such as voice over Internet protocol (VoIP) may be serviced through shared channels in the LTE system. Therefore, an entity for collecting state information, e.g., buffer state information, available transmit power state information, and channel state information, of UEs and performing scheduling may be required and the ENB 1a-05, 1a-10, 1a-15, or 1a-20 may serve as such an entity.

One ENB may generally control a plurality of cells. For example, the LTE system may use a radio access technology such as orthogonal frequency division multiplexing (OFDM) at a bandwidth of 20 MHz to achieve a data rate of 100 Mbps. However, the radio access technology usable by the LTE system is not limited thereto. The ENB 1a-05, 1a-10, 1a-15, or 1a-20 may also use adaptive modulation & coding (AMC) to determine a modulation scheme and a channel coding rate in accordance with a channel state of the UE 1a-35. The S-GW 1a-30 is an entity for providing data bearers and may establish and release the data bearers under the control of the MME 1a-25. The MME 1a-25 is an entity for performing a mobility management function and various control functions on the UE 1a-35 and may be connected to the plurality of ENBs 1a-05, 1a-10, 1a-15, and 1a-20.

Figure 1B:
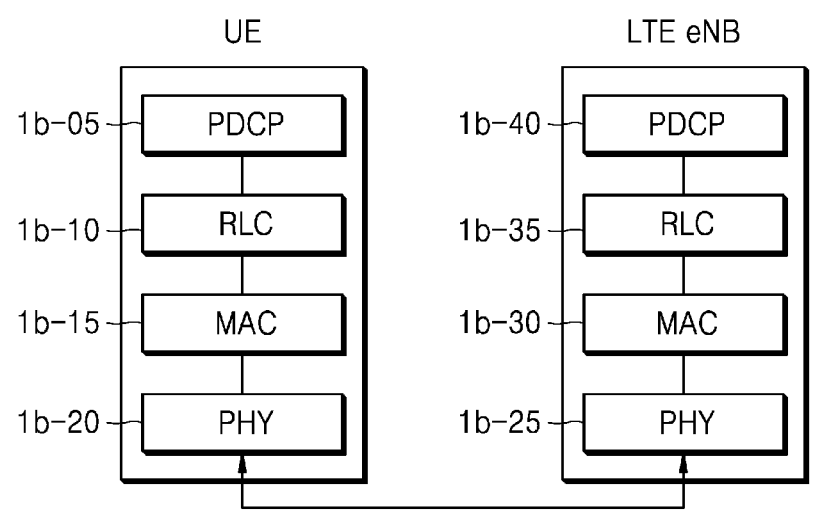
FIG. 1B is a diagram illustrating a radio protocol architecture of an LTE system according to an embodiment of the disclosure.

FIG. 1B is a diagram illustrating a radio protocol architecture of an LTE system according to an embodiment of the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 may be in charge of, for example, IP header compression/decompression. Main functions of the PDCP layer 1b-05 or 1b-40 may be summarized as shown below. However, the functions of the PDCP layer 1b-05 or 1b-40 are not limited thereto.

Header compression and decompression: robust header compression (ROHC) only
Transfer of user data
In-sequence delivery of upper layer packet data units (PDUs) at PDCP re-establishment procedure for RLC acknowledged mode (AM)
For split bearers in DC (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 may perform, for example, an automatic repeat request (ARQ) operation by reconfiguring PDCP PDUs to appropriate sizes. Main functions of the RLC layer 1b-10 or 1b-35 may be summarized as shown below. However, the functions of the RLC layer 1b-10 or 1b-35 are not limited thereto.

Transfer of upper layer PDUs
Error correction through ARQ (only for AM data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 may be connected to a plurality of RLC layers configured for one UE and multiplex RLC PDUs into a MAC PDU and demultiplex the RLC PDUs from the MAC PDU. Main functions of the MAC layer 1b-15 or 1b-30 may be summarized as shown below. However, the functions of the MAC layer 1b-15 or 1b-30 are not limited thereto.

Mapping between logical channels and transport channels
Multiplexing/demultiplexing of MAC SDUs belonging to one or different logical channels into/from transport blocks (TBs) delivered to/from the physical layer on transport channels
Scheduling information reporting
Error correction through hybrid ARQ (HARQ)
Priority handling between logical channels of one UE
Priority handling between UEs by means of dynamic scheduling
Multimedia broadcast/multicast service (MBMS) service identification
Transport format selection
Padding A physical (PHY) layer 1b-20 or 1b-25 may channel-code and modulate upper layer data into OFDM symbols and transmit the OFDM symbols through a wireless channel, or demodulate OFDM symbols received through a wireless channel and channel-decode and deliver the OFDM symbols to an upper layer. The PHY layer 1b-20 or 1b-25 may also use HARQ for additional error correction, and a receiver may transmit 1-bit information indicating whether a packet transmitted from a transmitter is received. Such information is called HARQ acknowledgement (ACK)/negative ACK (NACK) information. DL HARQ ACK/NACK information for UL transmission may be transmitted through a physical HARQ indicator channel (PHICH), and UL HARQ ACK/NACK information for DL transmission may be transmitted through a physical uplink control channel (PUCCH) or a physical uplink shared channel (PUSCH).

The PHY layer 1b-20 or 1b-25 may be configured to use one or more frequencies/carriers, and a technology for simultaneously configuring and using a plurality of frequencies is called carrier aggregation (CA). According to the CA technology, instead of using only one carrier for communication between a UE and an E-UTRAN nodeB (eNB), one main carrier and one or more subcarriers may be used to greatly increase a data rate by the number of subcarriers. In LTE, among cells covered by the eNB, a cell using a main carrier is called a primary cell (PCell), and a cell using a subcarrier is called a secondary cell (SCell).

Although not shown in FIG. 1B, radio resource control (RRC) layers are present above the PDCP layers 1b-05 and 1b-40 of the UE and the eNB, and may transmit and receive access- and measurement-related configuration control messages to control radio resources.

Figure 1C:
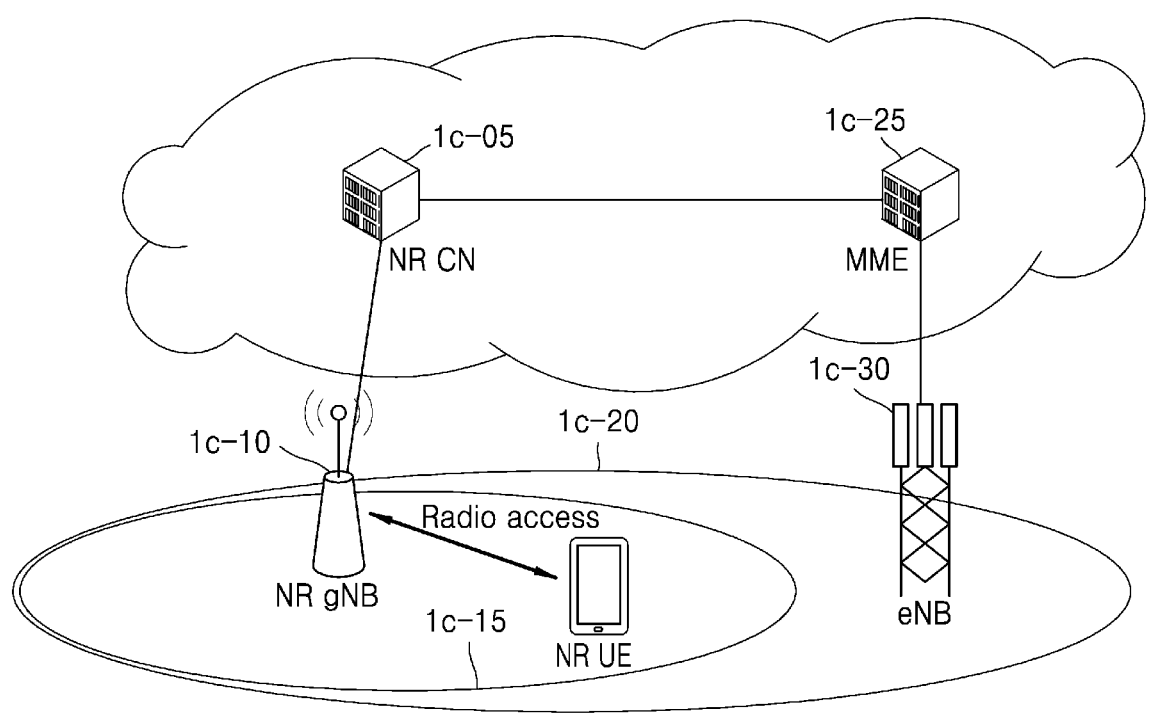
FIG. 1C is a schematic diagram of a new radio (NR) or $5^{th}$ generation (5G) system according to an embodiment of the disclosure.

FIG. 1C is a schematic diagram of a new radio (NR) or $5^{th}$ generation (5G) system according to an embodiment of the disclosure.

Referring to FIG. 1C, a radio access network of the NR or 5G system may include a new radio node B (NR gNB, NR NB, or gNB) 1c-10 and a new radio core network (NR CN)

1c-05. A new radio user equipment (NR UE) 1c-15 may access an external network via the NR gNB 1c-10 and the NR CN 1c-05.

In FIG. 1C, the NR gNB 1c-10 may correspond to an existing evolved node B (eNB) of an LTE system. The NR gNB 1c-10 may be connected to the NR UE 1c-15 through wireless channels and provide superior services compared to an existing node B. All user traffic data may be serviced through shared channels in the NR or 5G system. Therefore, an entity for collecting, for example, buffer state information of UEs, available transmit power state information, and channel state information and performing scheduling is required and the NR gNB 1c-10 may serve as such an entity. One NR gNB may control a plurality of cells. According to an embodiment of the disclosure, in the NR or 5G system, a bandwidth greater than the maximum bandwidth of the existing LTE system may be used to achieve an ultrahigh data rate. Beamforming technology may be additionally used by using orthogonal frequency division multiplexing (OFDM) as a radio access technology. According to an embodiment of the disclosure, the NR gNB 1c-10 may use adaptive modulation & coding (AMC) to determine a modulation scheme and a channel coding rate in accordance with a channel state of the NR UE 1c-15.

The NR CN 1c-05 may perform functions such as mobility support, bearer configuration, and quality of service (QoS) configuration. The NR CN 1c-05 is an entity for performing a mobility management function and various control functions on the NR UE 1c-15 and may be connected to a plurality of base stations. The NR or 5G system may cooperate with the existing LTE system, and the NR CN 1c-05 may be connected to an MME 1c-25 through a network interface. The MME 1c-25 may be connected to an existing eNB 1c-30.

Figure 1D:
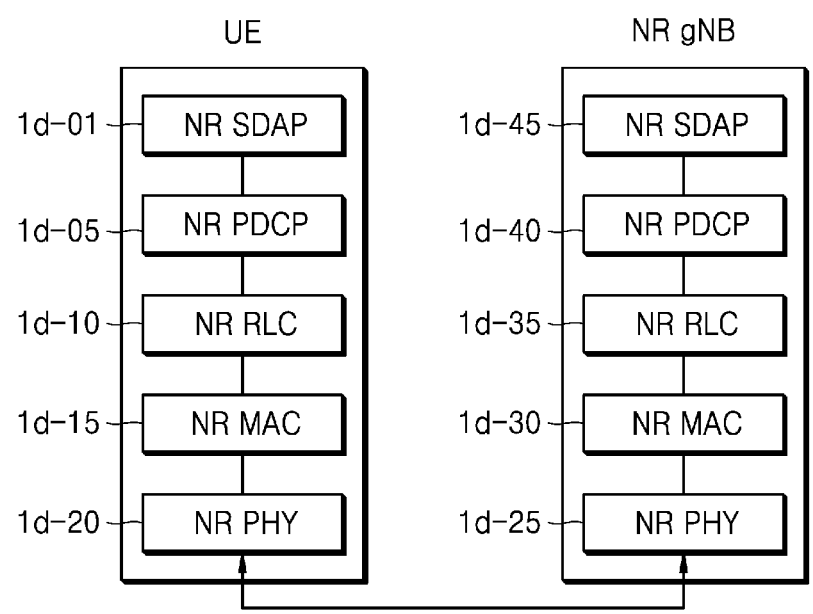
FIG. 1D is a diagram illustrating a radio protocol architecture of a NR or 5G system according to an embodiment of the disclosure.

FIG. 1D is a diagram illustrating a radio protocol architecture of a NR or 5G system according to an embodiment of the disclosure.

Referring to FIG. 1D, the radio protocol architecture of the NR or 5G system may include NR service data adaptation protocol (SDAP) layers 1d-01 and 1d-45, NR PDCP layers 1d-05 and 1d-40, NR RLC layers 1d-10 and 1d-35, NR MAC layers 1d-15 and 1d-30, and NR PHY layers 1d-20 and 1d-25 respectively for a UE and a NR gNB.

Main functions of the NR SDAP layer 1d-01 or 1d-45 may include some of the following functions. However, the functions of the NR SDAP layer 1d-01 or 1d-45 are not limited thereto.

Transfer of user plane data
Mapping between a QoS flow and a data radio bearer (DRB) for both DL and UL
Marking QoS flow identifier (ID) in both DL and UL packets
Reflective QoS flow to DRB mapping for the UL SDAP PDUs With regard to a SDAP layer, information about whether to use a header of the SDAP layer or to use functions of the SDAP layer may be configured for the UE by using a radio resource control (RRC) message per PDCP layer, per bearer, or per logical channel. When the SDAP header is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. According to an embodiment of the disclosure, QoS information may be used as data processing priority information or scheduling information for appropriately supporting a service.

According to an embodiment of the disclosure, main functions of the NR PDCP layer 1d-05 or 1d-40 may include some of the following functions. However, the functions of the NR PDCP layer 1d-05 or 1d-40 are not limited thereto.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above-description, the reordering function of the NR PDCP layer 1d-05 or 1d-40 may include a function of reordering PDCP PDUs received from a lower layer, on a PDCP sequence number (SN) basis. The reordering function of the NR PDCP layer 1d-05 or 1d-40 may include a function of delivering the reordered data to an upper layer in order or out of order, a function of recording missing PDCP PDUs by reordering the received PDCP PDUs, a function of reporting state information of the missing PDCP PDUs to a transmitter, or a function of requesting to retransmit the missing PDCP PDUs.

Main functions of the NR RLC layer 1d-10 or 1d-35 may include some of the following functions. However, the functions of the NR RLC layer 1d-10 or 1d-35 are not limited thereto.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, the in-sequence delivery function of the NR RLC layer 1d-10 or 1d-35 may include a function of delivering RLC SDUs received from a lower layer, to an upper layer in order. When a plurality of RLC SDUs segmented from one RLC SDU are received, the in-sequence delivery function of the NR RLC layer 1d-10 or 1d-35 may include a function of reassembling the RLC SDUs and delivering the reassembled RLC SDU.

The in-sequence delivery function of the NR RLC layer 1d-10 or 1d-35 may include a function of reordering received RLC PDUs on an RLC SN or PDCP SN basis, a function of recording missing RLC PDUs by reordering the received RLC PDUs, a function of reporting state information of the missing RLC PDUs to a transmitter, or a function of requesting to retransmit the missing RLC PDUs.

The in-sequence delivery function of the NR RLC layer 1d-10 or 1d-35 may include a function of delivering only RLC SDUs prior to a missing RLC SDU, to an upper layer in order when the missing RLC SDU exists. The in-sequence delivery function of the NR RLC layer 1d-10 or 1d-35 may include a function of delivering all RLC SDUs received before a timer starts, to an upper layer in order although a missing RLC SDU exists when a certain timer expires. The in-sequence delivery function of the NR RLC layer 1d-10 or 1d-35 may include a function of delivering all RLC SDUs received up to a current time, to an upper layer in order although a missing RLC SDU exists when a certain timer expires.

The NR RLC layer 1d-10 or 1d-35 may process the RLC PDUs in order of reception and deliver the RLC PDUs to the NR PDCP layer 1d-05 or 1d-40 regardless of SNs (out-of-sequence delivery).

When a segment is received, the NR RLC layer 1d-10 or 1d-35 may reassemble the segment with other segments stored in a buffer or subsequently received, into a whole RLC PDU and deliver the RLC PDU to the NR PDCP layer 1d-05 or 1d-40.

The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

In the above description, the out-of-sequence delivery function of the NR RLC layer 1d-10 or 1d-35 may include a function of directly delivering RLC SDUs received from a lower layer, to an upper layer out of order. The out-of-sequence delivery function of the NR RLC layer 1d-10 or 1d-35 may include a function of reassembling a plurality of RLC SDUs segmented from one RLC SDU and delivering the reassembled RLC SDU when the segmented RLC SDUs are received. The out-of-sequence delivery function of the NR RLC layer 1d-10 or 1d-35 may include a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer 1d-15 or 1d-30 may include some of the following functions. However, the functions of the NR MAC layer 1d-15 or 1d-30 are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 1d-20 or 1d-25 may channel-code and modulate upper layer data into OFDM symbols and transmit the OFDM symbols through a wireless channel, or demodulate OFDM symbols received through a wireless channel and channel-decode and deliver the OFDM symbols to an upper layer.

Figure 1E:
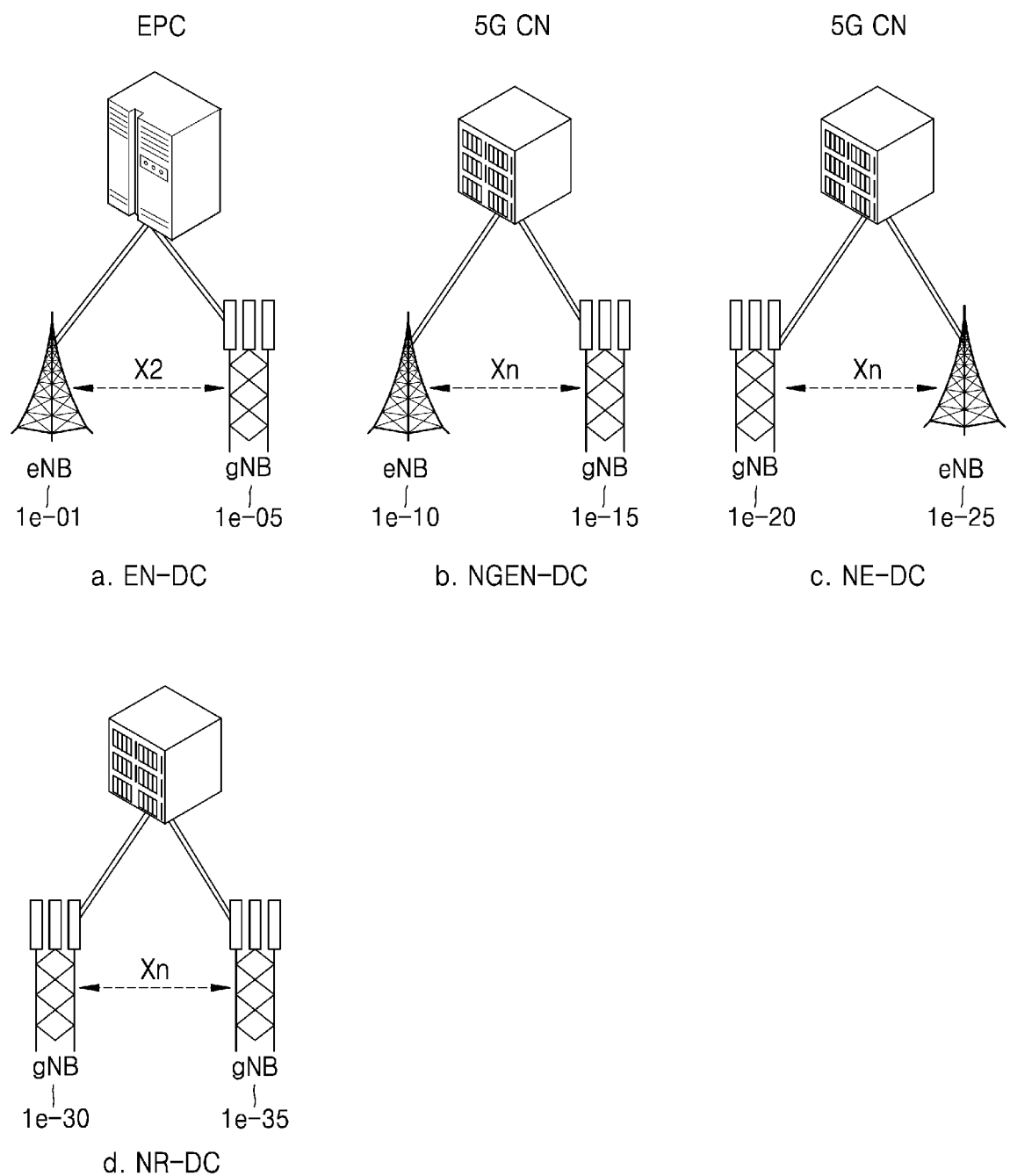
FIG. 1E is a diagram illustrating network architectures supporting multi-radio access technology-dual connectivity (MR-DC), according to an embodiment of the disclosure.

FIG. 1E is a diagram illustrating network architectures supporting multi-radio access technology-dual connectivity (MR-DC), according to an embodiment of the disclosure.

Referring to FIG. 1E, E-UTRA-NR dual connectivity (EN-DC) may enable a UE to be connected to an eNB 1e-01 serving as a master node (MN) and a gNB 1e-05 serving as a secondary node (SN). Referring to EN-DC of FIG. 1E, the eNB 1e-01 may be connected to an evolved packet core (EPC), and the gNB 1e-05 may or may not be connected to the EPC. Therefore, data may be transmitted and received directly or via an X2 interface to and from the UE supporting EN-DC, depending on whether the gNB 1e-05 is connected to the EPC.

Next generation E-UTRA-NR dual connectivity (NGEN-DC) may enable a UE to be connected to an eNB 1e-10 serving as a MN and a gNB 1e-15 serving as a SN. Referring to NGEN-DC of FIG. 1E, the eNB 1e-10 may be connected to a 5G core network (5G CN), and the gNB 1e-15 may or may not be connected to the 5G CN. Therefore, data may be transmitted and received directly or via an Xn interface to and from the UE supporting NGEN-DC, depending on whether the gNB 1e-15 is connected to the 5G CN.

NR-E-UTRA dual connectivity (NE-DC) may enable a UE to be connected to a gNB 1e-20 serving as a MN and an eNB 1e-25 serving as a SN. Referring to NE-DC of FIG. 1E, the gNB 1e-20 may be connected to a 5G CN, and the eNB 1e-25 may or may not be connected to the 5G CN. Therefore, data may be transmitted and received directly or via an Xn interface to and from the UE supporting NE-DC, depending on whether the eNB 1e-25 is connected to the 5G CN.

NR-NR dual connectivity (NR-DC) may enable a UE to be connected to a gNB 1e-30 serving as a MN and a gNB 1e-35 serving as a SN. Referring to NR-DC of FIG. 1E, the gNB 1e-30 may be connected to a 5G CN, and the other gNB 1e-35 may or may not be connected to the 5G CN. Therefore, data may be transmitted and received directly or via an Xn interface to and from the UE supporting NR-DC, depending on whether the gNB 1e-35 is connected to the 5G CN.

Figure 1F:
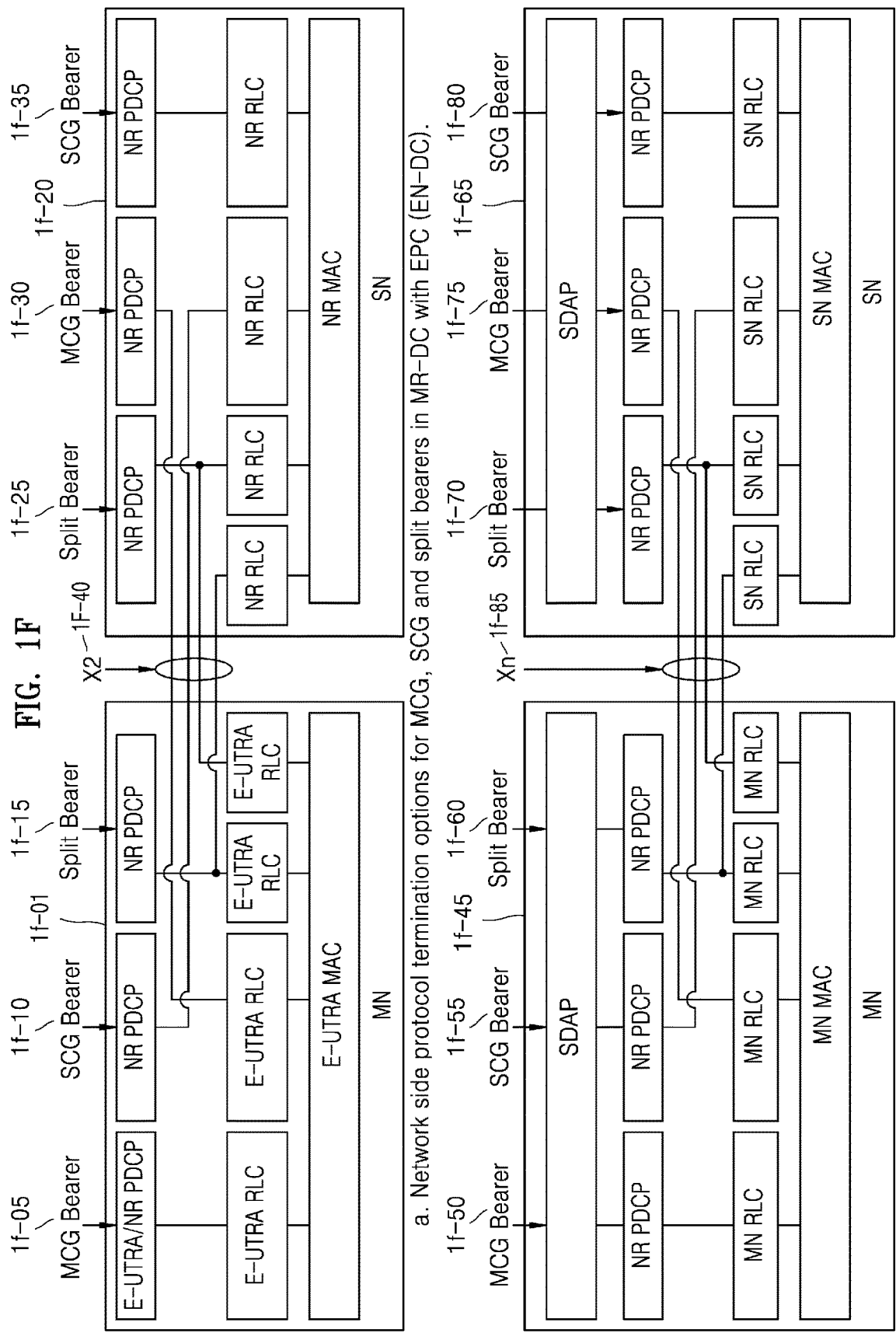
FIG. 1F is a diagram showing bearer types by which an LTE system or a NR or 5G system supports MR-DC, according to an embodiment of the disclosure.

FIG. 1F is a diagram showing bearer types by which an LTE system or a NR or 5G system supports MR-DC, according to an embodiment of the disclosure.

A master cell group (MCG) refers to a group of serving cells associated with the MN, and includes one special cell (SpCell) (i.e., primary cell of MCG, PCell) and optionally one or more secondary cells (SCells). A secondary cell group (SCG) refers to a group of SCells associated with the SN, and includes one SpCell (i.e., primary cell of SCG, PSCell) and optionally one or more SCells.

Referring to FIG. 1F, a MCG bearer refers to a radio bearer with an RLC bearer only in the MCG (e.g., 1f-05, 1f-30, 1f-50, or 1f-75), a SCG bearer refers to a radio bearer with an RLC bearer only in the SCG (e.g., 1f-10, 1f-35, 1f-55, or 1f-80), and a split bearer refers to a radio bearer with RLC bearers in both the MCG and SCG (e.g., 1f-15, 1f-25, 1f-60, or 1f-70). A MN terminated bearer refers to a radio bearer for which PDCP is located in the MN, and a SN terminated bearer refers to a radio bearer for which PDCP is located in the SN, in order to distinguish between the MCG bearer of the MN and the MCG bearer of the SN. For example, a MN terminated MCG bearer 1f-05 or 1f-50 refers to the MCG bearer of the MN, and a SN terminated MCG bearer 1f-30 or 1f-75 refers to the MCG bearer of the SN. The above definition is equally applied to distinguish between the SCG/split bearer of the MN and the SCG/split bearer of the SN.

In the disclosure, suspending of a bearer or layer means that the bearer or layer may not transmit or receive data and stops data processing and also means that the data of the bearer or layer is not considered for data transmission and buffer state reporting. On the other hand, resuming of a bearer or layer means that the bearer or layer may transmit or receive data and re-starts data processing and also means that the data of the bearer or layer is considered for data transmission and buffer state reporting.

Figure 1G:
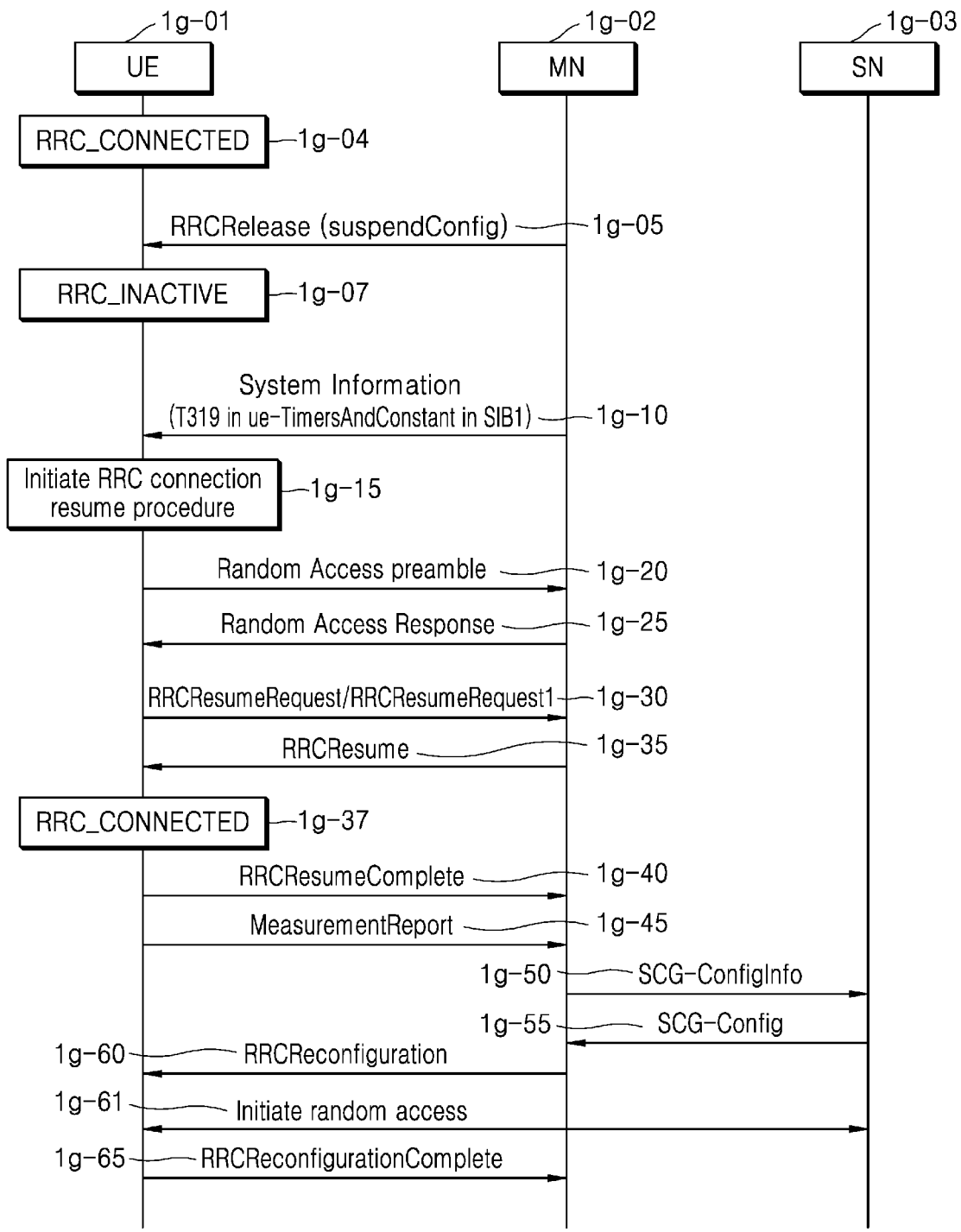
FIG. 1G is a flowchart of a method by which a user equipment (UE) supporting MR-DC is transited from a radio resource control (RRC)_INACTIVE (or RRC idle) mode to an RRC_CONNECTED mode by performing an RRC connection resume procedure with a base station, and by which the base station and the UE configure MR-DC by performing an RRC reconfiguration procedure, according to an embodiment of the disclosure.

FIG. 1G is a flowchart of a method by which a UE 1g-01 supporting MR-DC is transited from an RRC_INACTIVE (or RRC idle) mode to an RRC_CONNECTED mode by performing an RRC connection resume procedure with a base station, and by which the base station and the UE 1g-01 configure MR-DC by performing an RRC reconfiguration procedure, according to an embodiment of the disclosure.

Referring to FIG. 1G, the UE 1g-01 may transmit or receive data to or from one base station (e.g., a MN 1g-02) or two base stations (e.g., the MN 1g-02 and a SN 1g-03) in an RRC_CONNECTED mode (1g-04).

For a certain reason or when no data is transmitted to or received from the UE 1g-01 for a certain period of time, the MN 1g-02 may transmit an RRCRelease message including suspendConfig information to transit the UE 1g-01 to an RRC_INACTIVE mode (1g-05). The UE 1g-01 having received the RRCRelease message including the suspendConfig information may perform a series of processes described below. However, the processes performed by the UE 1g-01 are not limited thereto.

The UE 1g-01 may apply the received suspendConfig information.

The UE 1g-01 may reset MAC layers. This process is to prevent unnecessary retransmission of data stored in a HARQ buffer, when connection is resumed.

The UE 1g-01 may re-establish RLC layers for signaling radio bearer (SRB)1. This process is to prevent unnecessary retransmission of data stored in an RLC buffer, when connection is resumed, and to initialize variables for later use.

When the RRCRelease message is received in response to an RRCResumeRequest or RRCResumeRequest1 message, The UE 1g-01 may stop timer T319 when running.

The UE 1g-01 may replace at least one of KgNB and KRRCint keys, a cell radio network temporary identifier (C-RNTI), a cellIdentity, a physical cell identity, or suspendConfig information in stored UE Inactive AS context, with at least one of current KgNB and KRRCint keys, a temporary C-RNTI, a cellIdentity, or a physical cell identity of a cell having transmitted an RRC connection message (or the RRCRelease message), or the configured suspendConfig information.

When the RRCRelease message is not received in response to an RRCResumeRequest or RRCResumeRequest1 message, the UE 1g-01 may store at least one of the configured suspendConfig information, the current KgNB and KRRCint keys, a ROHC state, a UE identity (e.g., a C-RNTI) used in a source PCell, a cellIdentity of the source PCell, a physical cell identity of the source PCell, or all other parameters in the UE Inactive AS context. In this case, all other parameters may not include ReconfigurationWithSync and ServingCellConfigCommonSIB.

The UE 1g-01 may suspend all SRBs and DRBs, except SRB0.

The UE 1g-01 transited to the RRC_INACTIVE mode may find and camp on an appropriate cell through a cell selection procedure and/or a cell re-selection procedure and receive system information therefrom (1g-10). For example, the system information may include master information block (MIB), system information block (SIB)1, SIB2, SIB3, SIB4, SIB5, or SIB6. The SIB1 may include a value of timer T319.

When a request to resume the suspended RRC connection is received from upper layers or AS layers, the UE 1g-01 may initiate an RRC connection resume procedure (1g-15). For example, when the upper layers of the UE 1g-01 receive a next-generation radio access network (NG-RAN) paging message from at least one of the MN 1g-02 or the SN 1g-03, the UE 1g-01 may initiate the RRC connection resume procedure. The AS layers of the UE 1g-01 may request to resume the RRC connection in order to perform RAN-notification area update (RNAU). The RRC connection resume procedure may include a procedure for resuming suspended RRC connection to resume SRB(s) and DRB(s) or perform RNAU.

In operation 1g-15, the UE 1g-01 may perform a series of processes described below.

When the UE 1g-01 configures MR-DC and transmits or receives data to or from of the MN 1g-02 and the SN 1g-03 in operation 1g-04, the UE 1g-01 may release MR-DC configuration information when stored in the UE Inactive AS context. For example, the MR-DC configuration information may include at least one of radioBearerConfig2, sk-Counter, measConfig associated with SCG, SRB3, or SCG configuration information (e.g., mrdc-SecondaryCellGroup).

The UE 1g-01 may release MCG Scell(s) when stored in the UE Inactive AS context.

The UE 1g-01 may apply default L1 parameter values except for parameter values provided in SIB1.

The UE 1g-01 may apply default SRB1 configuration information.

The UE 1g-01 may apply default MAC cell group configuration information.

The UE 1g-01 may apply common control channel (CCCH) configuration information.

The UE 1g-01 may apply timeAlignmentTimersCommon included in SIB1.

The UE 1g-01 may start timer T319. Timer T319 may be configured to have a value signaled in SIB1.

The UE 1g-01 may configure pendingRnaUpdate to false.

The UE 1g-01 may initiate to transmit an RRCResumeRequest or RRCResumeRequest1 message. That is, the RRCResumeRequest or RRCResumeRequest1 message may include a resumeIdentity indicating a UE identity to facilitate UE context retrieval at a base station, a resumeMAC-I indicating encrypted authentication information, and a resumeCause, which may be submitted to lower layers to transmit the RRCResumeRequest or RRCResumeRequest1 message.

The UE 1g-01 may perform a random access procedure to resume the RRC connection with the MN 1g-02. The UE 1g-01 may select a physical random access channel (PRACH) occasion and transmit a random access preamble to the MN 1g-02 (1g-20). When the random access preamble is received, the MN 1g-02 may transmit a random access response (RAR) message to the UE 1g-01 (1g-25).

The UE 1g-01 having received the RAR message may transmit an RRCResumeRequest or RRCResumeRequest1 message to the MN 1g-02 (1g-30). When the RRCResumeRequest or RRCResumeRequest1 message is received, the MN 1g-02 may transmit an RRCResume message to the UE 1g-01 (1g-35). The RRCResume message may include radioBearerConfig, masterCellGroup, measConfig, and a fullConfig indicator. When the RRCResume message is received, the UE 1g-01 may stop timer T319 that runs, apply the information included in the RRCResume message, resume SRB2 and all DRBs, and be transited to the RRC_CONNECTED mode (1g-37). The UE 1g-01 transited to the RRC_CONNECTED mode may transmit an RRCResumeComplete message to the MN 1g-02 through SRB1 (1g-40).

In operation 1g-45, the UE 1g-01 may transmit a MeasurementReport message including measurement information to the MN 1g-02 (1g-45).

The MN 1g-02 may transmit a SCG-ConfigInfo message to the SN 1g-03 to apply MR-DC configuration to the UE 1g-01 (1g-50). In this case, the MN 1g-02 may select and transmit the SCG-ConfigInfo message to the SN 1g-03, based on the MeasurementReport message received in operation 1g-45. The SN 1g-03 may transmit a SCG-Config message to the MN 1g-02 (1g-55). Operations 1g-50 and 1g-55 may also be performed after operation 1g-40.

The MN 1g-02 may transmit an RRCReconfiguration message to the UE 1g-01 to configure MR-DC (1g-55). The RRCReconfiguration message may include at least one of radioBearerConfig2, sk-Counter, or mrdc-SecondaryCell-Group. The UE 1g-01 having received the RRCReconfiguration message may apply the information included in the RRCReconfiguration message. When reconfigurationWithSync for spCellConfig of a SCG is included in the RRCReconfiguration message, the UE 1g-01 may initiate a random access procedure on a SpCell of the SCG (i.e., a PSCell) (1g-61). The UE 1g-01 may transmit an RRCReconfigurationComplete message to the MN 1g-02 (1g-65). The order of the operation of transmitting the RRCReconfigurationComplete message and the operation of performing the random access procedure on the SCG may differ depending on implementation of the UE 1g-01. For example, the operation of transmitting the RRCReconfigurationComplete message and the operation of performing the random access procedure on the SCG may be performed sequentially, reversely, or simultaneously. However, random access needs to be triggered by an RRC layer of the UE 1g-01.

Figure 1H:
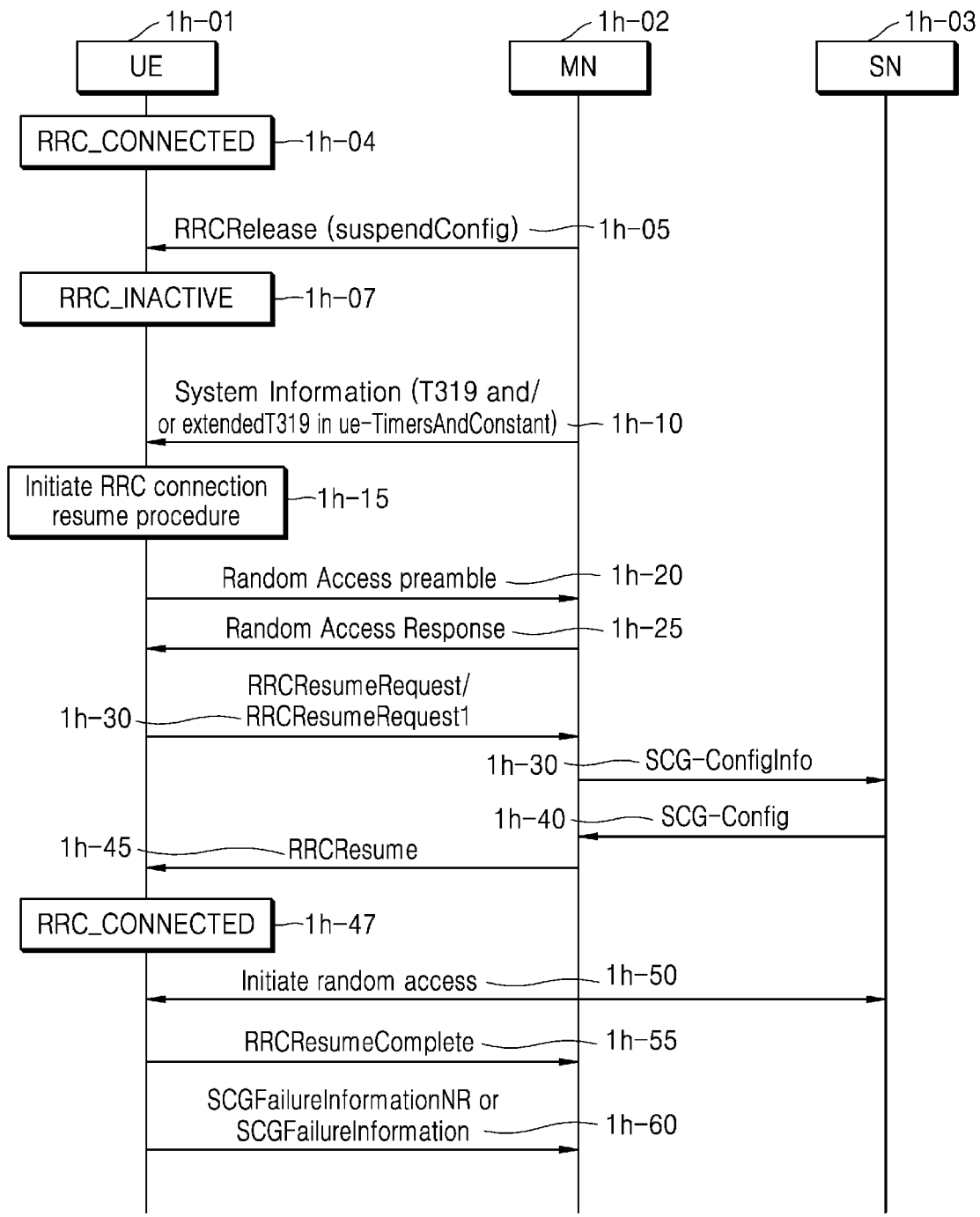
FIG. 1H is a flowchart of a method by which a UE supporting MR-DC configures MR-DC by performing an embedded RRC connection resume procedure with a base station, according to an embodiment of the disclosure.

FIG. 1H is a flowchart of a method by which a UE 1h-01 supporting MR-DC configures MR-DC by performing an embedded RRC connection resume procedure with a base station, according to an embodiment of the disclosure.

MR-DC configuration according to an embodiment of the disclosure may include a case described below.

To initiate an RRC connection resume procedure, the UE 1h-01 may maintain MR-DC configuration information when stored in UE Inactive AS Context. A MN 1h-02 (or a SN 1h-03) may provide MR-DC configuration information in an RRCResume message to the UE 1h-01. However, the MN 1h-02 (or the SN 1h-03) may not include full Scell configuration but include only delta configuration against stored Scell configuration, in the RRCResume message. Determination thereof may be performed in a blind manner.

Referring to FIG. 1H, the UE 1h-01 may transmit or receive data to or from one base station (e.g., the MN 1h-02) or two base stations (e.g., the MN 1h-02 and the SN 1h-03) in an RRC_CONNECTED mode (1h-04).

For a certain reason or when no data is transmitted to or received from the UE 1h-01 for a certain period of time, the MN 1h-02 may transmit an RRCRelease message including suspendConfig information to transit the UE 1h-01 to an RRC_INACTIVE mode (1h-05). In this case, the RRCRelease message may include a new timer value to be used to perform an embedded RRC connection resume procedure. For example, the new timer value may include a value of a new timer (i.e., extendedT319) having the same purpose as T319 used when the UE 1h-01 initiates the RRC connection resume procedure. The value of timer extendedT319 may have a range equal to or greater than that of the value of timer T319, and may be signaled as a value within the range. To perform the embedded RRC connection resume procedure, because the MN 1h-02 transmits the RRCResume message to the UE 1h-01 after negotiation of the MR-DC configuration information between the MN 1h-02 and the SN 1h-03 is finished, the value of timer extendedT319 may have a range greater than that of the value of timer T319. The UE 1h-01 having received the RRCRelease message including the suspendConfig information may perform a series of processes described below.

The UE 1h-01 may apply the received suspendConfig information.

The UE 1h-01 may reset MAC layers. This process is to prevent unnecessary retransmission of data stored in a HARQ buffer, when connection is resumed.

The UE 1h-01 may re-establish RLC layers for SRB1. This process is to prevent unnecessary retransmission of data stored in an RLC buffer, when connection is resumed, and to initialize variables for later use.

When the RRCRelease message is received in response to an RRCResumeRequest or RRCResumeRequest1 message, The UE 1h-01 may stop timer T319 or extendedT319 when running.

The UE 1h-01 may replace at least one of KgNB and KRRCint keys, a C-RNTI, a cellIdentity, a physical cell identity, or suspendConfig information in the stored UE Inactive AS context, with at least one of current KgNB and KRRCint keys, a temporary C-RNTI, a cellIdentity, or a physical cell identity of a cell having transmitted an RRC connection message (or the RRCRelease message), or the configured suspendConfig information.

When the RRCRelease message is not received in response to an RRCResumeRequest or RRCResumeRequest1 message, the UE 1h-01 may store at least one of the configured suspendConfig information, the current KgNB and KRRCint keys, a ROHC state, a UE identity (e.g., a C-RNTI) used in a source PCell, a cellIdentity of the source PCell, a physical cell identity of the source PCell, or all other parameters in the UE Inactive AS context. In this case, all other parameters may not include ReconfigurationWithSync and ServingCellConfigCommonSIB.

The UE 1h-01 may suspend all SRBs and DRBs, except SRB0.

The UE 1h-01 transited to the RRC_INACTIVE mode may find and camp on an appropriate cell through a cell selection procedure and/or a cell re-selection procedure and receive system information therefrom (1h-10). For example, the system information may include master MIB, SIB1, SIB2, SIB3, SIB4, SIB5, or SIB6. The system information may include a value of timer T319 and/or a value of timer extendedT319. When a request to resume the suspended RRC connection is received from upper layers or AS layers, the UE 1h-01 may initiate an embedded RRC connection resume procedure (1h-15). For example, when the upper layers of the UE 1h-01 receive a NG-RAN paging message from at least one of the MN 1h-02 or the SN 1h-03, the UE 1h-01 may initiate the embedded RRC connection resume procedure. The AS layers of the UE 1h-01 may request to resume the RRC connection in order to perform RNAU. In the disclosure, the embedded RRC connection resume procedure may be performed when the UE 1h-01 configures MR-DC in operation 1h-04 and/or when the RRCRelease message includes a value of timer extendedT319 and/or when the system information signals a value of timer extendedT319.

In operation 1h-15, the UE 1h-01 may perform a series of processes described below.

When the UE 1h-01 configures MR-DC and transmits or receives data to or from of the MN 1h-02 and the SN 1h-03 in operation 1h-04, the UE 1h-01 may release MR-DC configuration information when stored in the UE Inactive AS context. For example, the MR-DC configuration information may include measConfig associated with SCG, SRB3 (configured according to radioBearerConfig), or SCG configuration information (e.g., mrdc-SecondaryCellGroup).

The UE 1h-01 may release MCG Scell(s) when stored in the UE Inactive AS context.

The UE 1h-01 may apply default L1 parameter values except for parameter values provided in SIB1.

The UE 1h-01 may apply default SRB1 configuration information.

The UE 1h-01 may apply default MAC cell group configuration information.

The UE 1h-01 may apply CCCH configuration information.

The UE 1h-01 may apply timeAlignmentTimersCommon included in SIB1.

When MR-DC is configured in operation 1h-04, the UE 1h-01 may start the new timer (i.e., extendedT319) proposed according to an embodiment of the disclosure. Timer extendedT319 may be configured to have a value signaled in the RRCRelease message or the system information (e.g., SIB1). When the value of timer extendedT319 is not included in the RRCRelease message, the value of timer extendedT319 signaled in the system information may be configured.

The UE 1h-01 may configure pendingRnaUpdate to false.

The UE 1h-01 may initiate to transmit an RRCResumeRequest or RRCResumeRequest1 message. That is, the RRCResumeRequest or RRCResumeRequest1 message may include a resumeIdentity indicating a UE identity to facilitate UE context retrieval at a base station, a resumeMAC-I indicating encrypted authentication information, and a resumeCause, which may be submitted to lower layers to transmit the RRCResumeRequest or RRCResumeRequest1 message.

The UE 1h-01 may perform a random access procedure to resume the RRC connection with the MN 1h-02. The UE 1h-01 may select a PRACH occasion and transmit a random access preamble to the MN 1h-02 (1h-20). When the random access preamble is received, the MN 1h-02 may transmit a RAR message to the UE 1h-01 (1h-25).

The UE 1h-01 having received the RAR message may transmit an RRCResumeRequest or RRCResumeRequest1 message to the MN 1h-02 (1h-30). The MN 1h-02 having received the RRCResumeRequest or RRCResumeRequest1 message may transmit a SCG-ConfigInfo message to the SN 1h-03 to configure MR-DC for the UE 1h-01 (1h-35). The SN 1h-03 may transmit a SCG-Config message to the MN 1h-02 (1h-40). The MN 1h-02 may transmit an RRCResume message to the UE 1h-01 (1h-45). The RRCResume message may include at least radioBearerConfig2, sk-Counter, mrdc-SecondaryCellGroup, or a part of the SCG-ConfigInfo message. When the RRCResume message is received, the UE 1h-01 may stop timer extendedT319 that runs, apply the information included in the RRCResume message, resume measurement when suspended, resume SRB2 and all DRBs, and be transited to the RRC_CONNECTED mode (1h-47). When reconfigurationWithSync for spCellConfig of a SCG or a value of timer T304 is included in an RRCReconfiguration message (or the RRCResume message), the UE 1h-01 may initiate a random access procedure on a SpCell of the SCG (i.e., a PSCell) (1h-50). The UE 1h-01 transited to the RRC_CONNECTED mode may transmit an RRCResumeComplete message to the MN 1h-02 through SRB1 (1h-55).

When random access is triggered in operation 1h-50 (that is, when reconfigurationWithSync for spCellConfig of the SCG is included in the RRCResume message), the UE 1h-01 may start timer T304. When a PScell may not be found until running timer T304 expires or for a certain period of time and thus random access may not be initiated, the UE 1h-01 may report an RRC message to the MN 1h-02 (1h-60). The RRC message may include at least one of, for example, SCGFailureInformationNR or SCGFailureInformation. In this case, one of pre-defined failureTypes (e.g., randomAccessProblem) or a newly defined failureType may be included in the RRC message. Operation 1h-60 may not be necessarily performed before operation 1h-55.

Figure 1I:
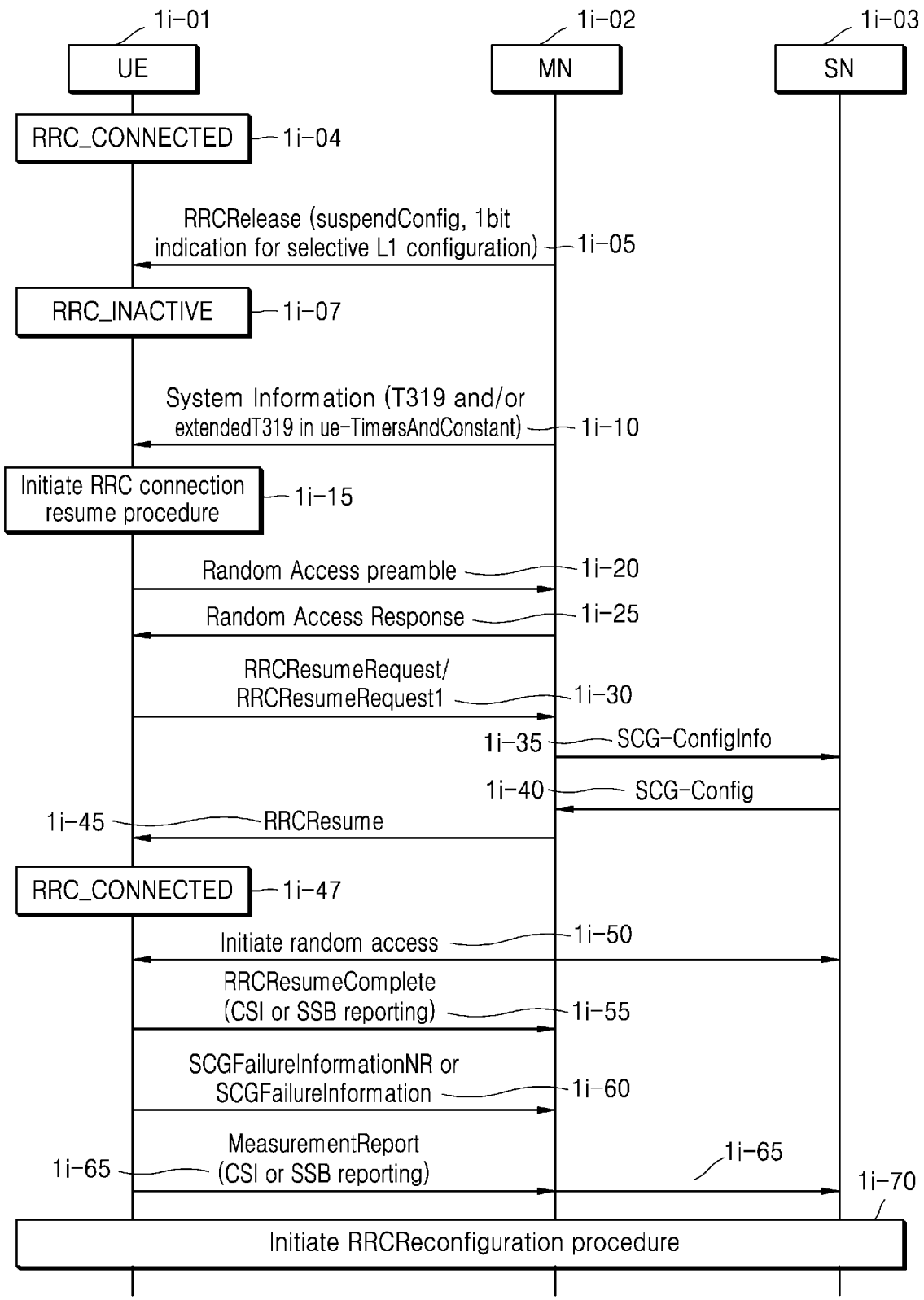
FIG. 1I is a flowchart of a method by which a UE supporting MR-DC configures MR-DC by performing an embedded RRC connection resume procedure with a base station, according to an embodiment of the disclosure.

FIG. 1I is a flowchart of a method by which a UE 1i-01 supporting MR-DC configures MR-DC by performing an embedded RRC connection resume procedure with a base station, according to an embodiment of the disclosure.

MR-DC configuration according to an embodiment of the disclosure may include a case described below.

To initiate an RRC connection resume procedure, the UE 1i-01 may maintain MR-DC configuration information when stored in UE Inactive AS Context. A MN 1i-02 (or a SN 1i-03) may provide MR-DC configuration information in an RRCResume message to the UE 1i-01. However, the MN 1i-02 (or the SN 1i-03) may not include full Scell configuration but include only delta configuration against stored Scell configuration, in the RRCResume message. Determination thereof may be performed in a blind manner. Scell(s) determined in a blind manner may be immediately activated by the RRCResume message and may transmit or receive data.

Referring to FIG. 1I, the UE 1i-01 may transmit or receive data to or from one base station (e.g., the MN 1i-02) or two base stations (e.g., the MN 1i-02 and the SN 1i-03) in an RRC_CONNECTED mode (1i-04).

For a certain reason or when no data is transmitted to or received from the UE 1i-01 for a certain period of time, the MN 1i-02 may transmit an RRCRelease message including suspendConfig information to transit the UE 1i-01 to an RRC_INACTIVE mode (1i-05). In this case, the RRCRelease message may include a new timer value to be used to perform an embedded RRC connection resume procedure. For example, the new timer value may include a value of a new timer (i.e., extendedT319) having the same purpose as T319 used when the UE 1i-01 initiates the RRC connection resume procedure. The value of timer extendedT319 may have a range equal to or greater than that of the value of timer T319, and may be signaled as a value within the range. To perform the embedded RRC connection resume procedure, because the MN 1i-02 transmits the RRCResume message to the UE 1i-01 after negotiation of the MR-DC configuration information between the MN 1i-02 and the SN 1i-03 is finished, the value of timer extendedT319 may have a range greater than that of the value of timer T319.

The RRCRelease message may also include a 1-bit indicator indicating whether to store L1 configuration information (e.g., SCell configuration information included in ServingCellConfig and/or ServingCellConfigCommon) in the UE Inactive AS context. When indicated to store the L1 configuration information, the UE 1i-01 may store the L1 configuration information not for PCell but for Scell and PSCell in the UE Inactive AS context. Alternatively, when the UE 1i-01 always stores the L1 configuration information in the UE Inactive AS context, the RRCRelease message may include a 1-bit indicator indicating whether to maintain the L1 configuration information stored in the UE Inactive AS context, to initiate the RRC connection resume procedure. When indicated to maintain the L1 configuration information, the UE 1*i*-01 may not release the L1 configuration information for Scell and PSCell to initiate the RRC connection resume procedure. The UE 1*i*-01 having received the RRCRelease message including the suspendConfig information may perform a series of processes described below.

The UE 1*i*-01 may apply the received suspendConfig information.

The UE 1*i*-01 may reset MAC layers. This process is to prevent unnecessary retransmission of data stored in a HARQ buffer, when connection is resumed.

The UE 1*i*-01 may re-establish RLC layers for SRB1. This process is to prevent unnecessary retransmission of data stored in an RLC buffer, when connection is resumed, and to initialize variables for later use.

When the RRCRelease message is received in response to an RRCResumeRequest or RRCResumeRequest1 message, The UE 1*i*-01 may stop timer T319 or extendedT319 when running.

The UE 1*i*-01 may replace at least one of KgNB and KRRCint keys, a C-RNTI, a cellIdentity, a physical cell identity, or suspendConfig information in the stored UE Inactive AS context, with at least one of current KgNB and KRRCint keys, a temporary C-RNTI, a cellIdentity, or a physical cell identity of a cell having transmitted an RRC connection message (or the RRCRelease message), or the configured suspendConfig information.

When the RRCRelease message is not received in response to an RRCResumeRequest or RRCResumeRequest1 message, the UE 1*i*-01 may store the configured suspendConfig information, the current KgNB and KRRCint keys, a ROHC state, a UE identity (e.g., a C-RNTI) used in a source PCell, a cellIdentity of the source PCell, a physical cell identity of the source PCell, or all other parameters in the UE Inactive AS context. In this case, all other parameters may not include ReconfigurationWithSync and ServingCellConfigCommonSIB.

The UE 1*i*-01 may suspend all SRBs and DRBs, except SRB0.

The UE 1*i*-01 transited to the RRC_INACTIVE mode may find and camp on an appropriate cell through a cell selection procedure and/or a cell re-selection procedure and receive system information therefrom (1*i*-10). For example, the system information may include master MIB, SIB1, SIB2, SIB3, SIB4, SIB5, or SIB6. The system information may include a value of timer T319 and/or a value of timer extendedT319. When a request to resume the suspended RRC connection is received from upper layers or AS layers, the UE 1*i*-01 may initiate an embedded RRC connection resume procedure (1*i*-15). For example, when the upper layers of the UE 1*i*-01 receive a NG-RAN paging message from at least one of the MN 1*i*-02 or the SN 1*i*-03, the UE 1*i*-01 may initiate the embedded RRC connection resume procedure. The AS layers of the UE 1*i*-01 may request to resume the RRC connection in order to perform RNAU. The RRC connection resume procedure may include a procedure for resuming suspended RRC connection to resume SRB(s) and DRB(s) or perform RNAU. In the disclosure, the embedded RRC connection resume procedure may be performed when the UE 1*i*-01 configures MR-DC in operation 1*i*-04 and/or when the RRCRelease message includes a value of timer extendedT319 and/or when the system information signals a value of timer extendedT319.

In operation 1*i*-15, the UE 1*i*-01 may perform at least some of a series of processes described below.

When the UE 1*i*-01 configures MR-DC and transmits or receives data to or from of the MN 1*i*-02 and the SN 1*i*-03 in operation 1*i*-04, the UE 1*i*-01 may maintain MR-DC configuration information when stored in the UE Inactive AS context. For example, the MR-DC configuration information may include measConfig associated with SCG, SRB3 (configured according to radioBearerConfig), or SCG configuration information (e.g., mrdc-SecondaryCellGroup).

When the RRCRelease message includes the indicator indicating whether to maintain the L1 configuration information to initiate the RRC connection resume procedure, the UE 1*i*-01 may maintain the L1 configuration information for Scell and PSCell in the UE Inactive AS context.

The UE 1*i*-01 may apply default L1 parameter values except for parameter values provided in SIB1.

The UE 1*i*-01 may apply default SRB1 configuration information.

The UE 1*i*-01 may apply default MAC cell group configuration information.

The UE 1*i*-01 may apply CCCH configuration information.

The UE 1*i*-01 may apply timeAlignmentTimersCommon included in SIB1.

When MR-DC is configured in operation 1*i*-04, the UE 1*i*-01 may start the new timer (i.e., extendedT319) proposed according to an embodiment of the disclosure. Timer extendedT319 may be configured to have a value signaled in the RRCRelease message or the system information (e.g., SIB1). When the value of timer extendedT319 is not included in the RRCRelease message, the value of timer extendedT319 signaled in the system information may be configured.

The UE 1*i*-01 may configure pendingRnaUpdate to false.

The UE 1*i*-01 may initiate to transmit an RRCResumeRequest or RRCResumeRequest1 message. That is, the RRCResumeRequest or RRCResumeRequest1 message may include a resumeIdentity indicating a UE identity to facilitate UE context retrieval at a base station, a resumeMAC-I indicating encrypted authentication information, and a resumeCause, which may be submitted to lower layers to transmit the RRCResumeRequest or RRCResumeRequest1 message.

The UE 1*i*-01 may perform a random access procedure to resume the RRC connection with the MN 1*i*-02. The UE 1*i*-01 may select a PRACH occasion and transmit a random access preamble to the MN 1*i*-02 (1*i*-20). When the random access preamble is received, the MN 1*i*-02 may transmit a RAR message to the UE 1*i*-01 (1*i*-25).

The UE 1*i*-01 having received the RAR message may transmit an RRCResumeRequest or RRCResumeRequest1 message to the MN 1*i*-02 (1*i*-30). The MN 1*i*-02 having received the RRCResumeRequest or RRCResumeRequest1 message may transmit a SCG-ConfigInfo message to the SN 1*i*-03 to configure MR-DC for the UE 1*i*-01 (1*i*-35). The SN 1*i*-03 may transmit a SCG-Config message to the MN 1*i*-02 (1*i*-40). The MN 1*i*-02 may transmit an RRCResume message to the UE 1*i*-01 (1*i*-45). The RRCResume message may include at least radioBearerConfig2, sk-Counter, mrdc-SecondaryCellGroup, or a part of the SCG-ConfigInfo message. When the RRCResume message is received, the UE 1*i*-01 may stop timer extendedT319 that runs, apply the information included in the RRCResume message, resume measurement when suspended, resume SRB2 and all DRBs, and be transited to the RRC_CONNECTED mode (1$i$-47). When reconfigurationWithSync for spCellConfig of a SCG or a value of timer T304 is included in an RRCReconfiguration message (or the RRCResume message), the UE 1$i$-01 may initiate a random access procedure on a SpCell of the SCG (i.e., a PSCell) (1$i$-50). The UE 1$i$-01 transited to the RRC_CONNECTED mode may transmit an RRCResumeComplete message to the MN 1$i$-02 through SRB1 (1$i$-55). When channel state information (CSI) of each of one or more Scells resumed by the RRCResume message indicates out of range (OOR)/0 (for example, when the UE 1$i$-01 may decode a physical downlink control channel (PDCCH) but may not decode a physical downlink shared channel (PDSCH) from the Scell) or when synchronization signal block (SSB) reference signal received power (RSRP) is equal to or less than a certain reference value, information thereon may be included in the RRCResumeComplete message. A criterion for determining OOR/0 or the certain reference value may be included in the RRCResume message or the system information, or pre-configured as a default value.

When random access is triggered in operation 1$i$-50 (that is, when reconfigurationWithSync for spCellConfig of the SCG is included in the RRCResume message), the UE 1$i$-01 may start timer T304. When a PScell may not be found until running timer T304 expires or for a certain period of time and thus random access may not be initiated, the UE 1$i$-01 may report an RRC message to the MN 1$i$-02 (1$i$-60). The RRC message may include, for example, SCGFailureInformationNR or SCGFailureInformation. In this case, one of pre-defined failureTypes (e.g., randomAccessProblem) or a newly defined failureType may be included in the RRC message. Operation 1$i$-60 may not be necessarily performed before operation 1$i$-55.

In operation 1$i$-65, when CSI of each of one or more Scells resumed by the RRCResume message indicates OOR/0 (for example, when the UE 1$i$-01 may decode a PDCCH but may not decode a PDSCH from the Scell) or when SSB RSRP is equal to or less than the certain reference value, information thereon may be included in a MeasurementReport message and be reported to the MN 1$i$-02 or the SN 1$i$-03. To report the SN 1$i$-03, SRB3 needs to be established.

After operation 1$i$-55 or 1$i$-65, the MN 1$i$-02 or the SN 1$i$-03 may perform an RRC reconfiguration procedure (1$i$-70) to modify MR-DC configuration with the UE 1$i$-01. Likewise, when SRB3 is established, the UE 1$i$-01 may perform the RRC reconfiguration procedure with the SN 1$i$-03.

Figure 1J:
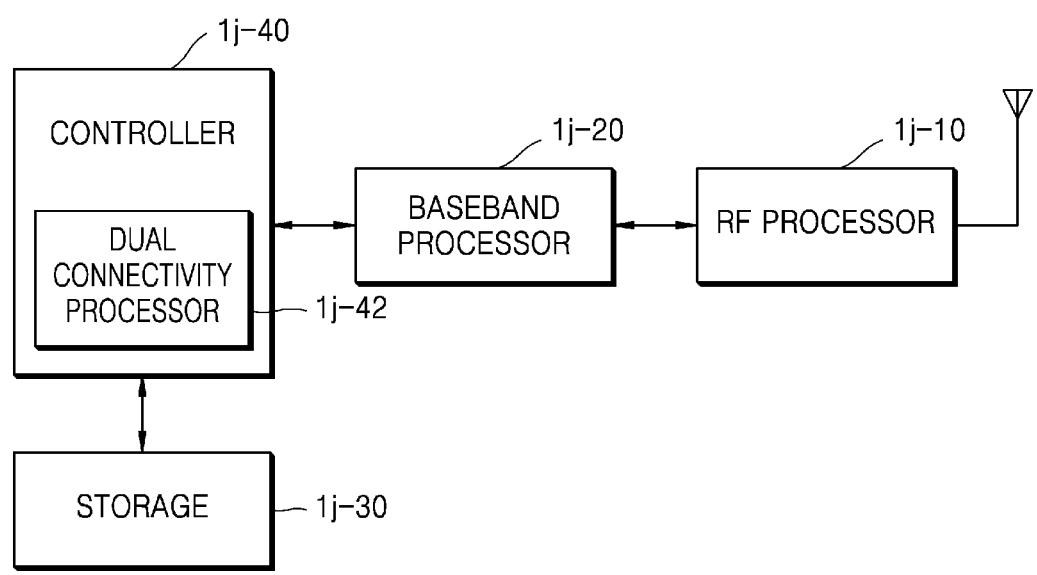
FIG. 1J is a block diagram of a UE according to an embodiment of the disclosure.

FIG. 1J is a block diagram of a UE according to an embodiment of the disclosure.

According to an embodiment of the disclosure, the UE may include a radio frequency (RF) processor 1$j$-10, a baseband processor 1$j$-20, a storage 1$j$-30, and a controller 1$j$-40. However, the UE is not limited thereto and may include a larger or smaller number of elements compared to those illustrated in FIG. 1J.

According to an embodiment of the disclosure, the RF processor 1$j$-10 may perform functions for transmitting and receiving signals through wireless channels, e.g., band conversion and amplification of the signals. That is, the RF processor 1$j$-10 may up-convert a baseband signal provided from the baseband processor 1$j$-20, into an RF band signal and then transmit the RF band signal through an antenna, and down-convert an RF band signal received through the antenna, into a baseband signal. For example, the RF processor 1$j$-10 may include a transmit filter, a receive filter, an amplifier, a mixer, an oscillator, a digital-to-analog convertor (DAC), and an analog-to-digital convertor (ADC). Although only one antenna is illustrated in FIG. 1J, the UE may include a plurality of antennas.

The RF processor 1$j$-10 may include a plurality of RF chains. Furthermore, the RF processor 1$j$-10 may perform beamforming. For beamforming, the RF processor 1$j$-10 may adjust phases and intensities of signals to be transmitted or received through a plurality of antennas or antenna elements. The RF processor 1$j$-10 may perform multiple-input and multiple-output (MIMO) and receive data of a plurality of layers in the MIMO operation. The RF processor 1$j$-10 may perform received beam sweeping by appropriately configuring a plurality of antennas or antenna elements, or adjust a direction and a beam width of a received beam to coordinate with a transmit beam, under the control of the controller 1$j$-40.

The baseband processor 1$j$-20 may convert between a baseband signal and a bitstream based on physical layer specifications of a system. For example, for data transmission, the baseband processor 1$j$-20 may generate complex symbols by encoding and modulating a transmit bitstream. For data reception, the baseband processor 1$j$-20 may reconstruct a received bitstream by demodulating and decoding a baseband signal provided from the RF processor 1$j$-10. For example, according to an orthogonal frequency division multiplexing (OFDM) scheme, for data transmission, the baseband processor 1$j$-20 may generate complex symbols by encoding and modulating a transmit bitstream, map the complex symbols to subcarriers, and then configure OFDM symbols by performing inverse fast Fourier transformation (IFFT) and cyclic prefix (CP) insertion. For data reception, the baseband processor 1$j$-20 may segment a baseband signal provided from the RF processor 1$j$-10, into OFDM symbol units, reconstruct signals mapped to subcarriers by performing fast Fourier transformation (FFT), and then reconstruct a received bitstream by demodulating and decoding the signals.

The baseband processor 1$j$-20 and the RF processor 1$j$-10 may transmit and receive signals as described above. As such, the baseband processor 1$j$-20 and the RF processor 1$j$-10 may also be called a transmitter, a receiver, a transceiver, or a communicator. Furthermore, at least one of the baseband processor 1$j$-20 or the RF processor 1$j$-10 may include a plurality of communication modules to support a plurality of different radio access technologies. At least one of the baseband processor 1$j$-20 or the RF processor 1$j$-10 may include different communication modules to process signals of different frequency bands. For example, the different radio access technologies may include a wireless LAN (e.g., IEEE 802.11) and a cellular network (e.g., an LTE network). The different frequency bands may include a super-high frequency (SHF) (e.g., 2.2 GHz or 2 GHz) band and a millimeter wave (mmWave) (e.g., 60 GHz) band. The UE may transmit and receive signals to and from a base station by using the baseband processor 1$j$-20 and the RF processor 1$j$-10, and the signals may include control information and data.

The storage 1$j$-30 may store data such as basic programs, application programs, and configuration information for operations of the UE. The storage 1$j$-30 may provide the stored data upon request by the controller 1$j$-40. The storage 1$j$-30 may include any or a combination of storage media such as read-only memory (ROM), random access memory (RAM), a hard disk, a compact disc (CD)-ROM, and a digital versatile disc (DVD). The storage 1j-30 may include a plurality of memories.

The controller 1j-40 may control overall operations of the UE. For example, the controller 1j-40 may transmit and receive signals through the baseband processor 1j-20 and the RF processor 1j-10. The controller 1j-40 records and reads data on or from the storage 1j-30. In this regard, the controller 1j-40 may include at least one processor. For example, the controller 1j-40 may include a communication processor (CP) for controlling communications and an application processor (AP) for controlling an upper layer such as an application program. In addition, the controller 1j-40 may control the above-described UE to perform an RRC connection resume procedure with the base station. For example, the controller 1j-40 may control the other elements of the UE to receive an RRCRelease message including suspendConfig information, transit to an RRC_INACTIVE mode based on the RRCRelease message, transmit an RRC resume request message to the base station when a certain condition is satisfied, receive an RRCResume message from the base station, and resume suspended RRC connection based on the received RRCResume message. However, the controller 1j-40 is not limited thereto and may control the other elements of the UE to operate according to the afore-described embodiments of the disclosure. At least one element in the UE may be configured as one chip.

Figure 1K:
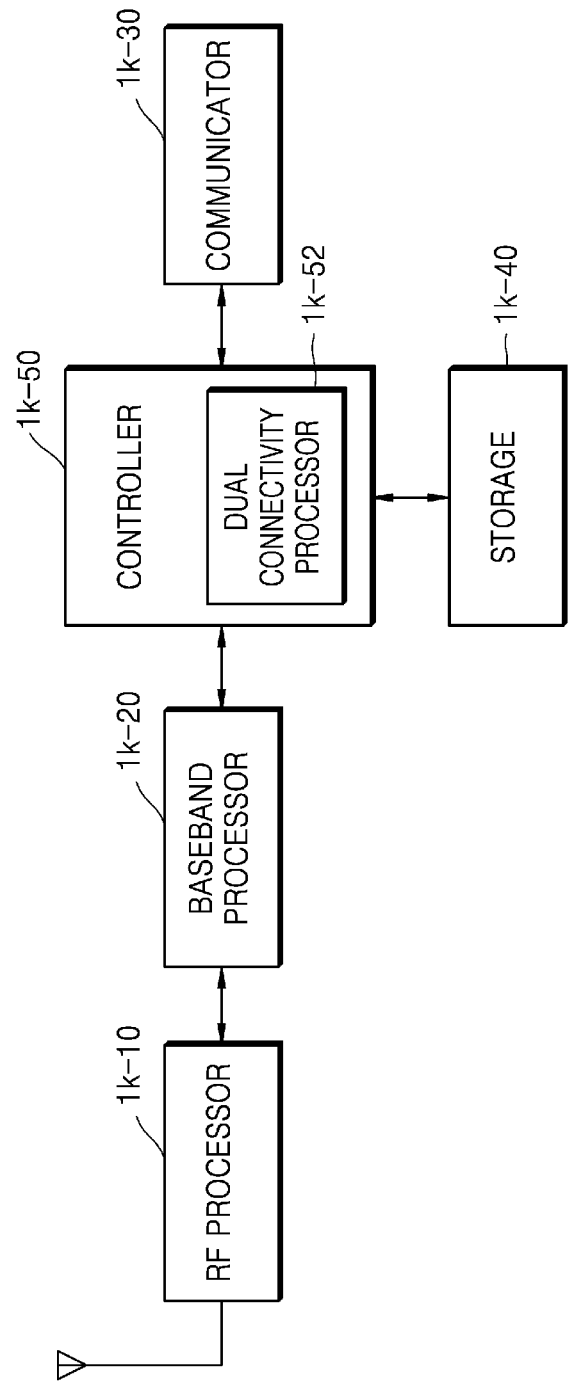
FIG. 1K is a block diagram of a base station according to an embodiment of the disclosure.

FIG. 1K is a block diagram of a base station according to an embodiment of the disclosure.

The base station according to an embodiment of the disclosure may include one or more transmission reception points (TRPs). Referring to FIG. 1K, the base station according to an embodiment of the disclosure may include an RF processor 1k-10, a baseband processor 1k-20, a communicator 1k-30, a storage 1k-40, and a controller 1k-50. However, the base station is not limited thereto and may include a smaller or larger number of elements compared to those illustrated in FIG. 1K.

The RF processor 1k-10 may perform functions for transmitting and receiving signals through wireless channels, e.g., band conversion and amplification of the signals. That is, the RF processor 1k-10 may up-convert a baseband signal provided from the baseband processor 1k-20, into an RF band signal and then transmit the RF band signal through an antenna, and down-convert an RF band signal received through an antenna, into a baseband signal. For example, the RF processor 1k-10 may include a transmit filter, a receive filter, an amplifier, a mixer, an oscillator, a DAC, and an ADC. Although only one antenna is illustrated in FIG. 1K, the base station may include a plurality of antennas. The RF processor 1k-10 may include a plurality of RF chains. Furthermore, the RF processor 1k-10 may perform beamforming. For beamforming, the RF processor 1k-10 may adjust phases and intensities of signals to be transmitted or received through a plurality of antennas or antenna elements. The RF processor 1k-10 may perform DL MIMO by transmitting data of one or more layers.

The baseband processor 1k-20 may convert between a baseband signal and a bitstream based on physical layer specifications of a radio access technology. For example, for data transmission, the baseband processor 1k-20 may generate complex symbols by encoding and modulating a transmit bitstream. For data reception, the baseband processor 1k-20 may reconstruct a received bitstream by demodulating and decoding a baseband signal provided from the RF processor 1k-10. For example, according to an OFDM scheme, for data transmission, the baseband processor 1k-20 may generate complex symbols by encoding and modulating a transmit bitstream, map the complex symbols to subcarriers, and then configure OFDM symbols by performing IFFT and CP insertion. For data reception, the baseband processor 1k-20 may segment a baseband signal provided from the RF processor 1k-10, into OFDM symbol units, reconstruct signals mapped to subcarriers by performing FFT, and then reconstruct a received bitstream by demodulating and decoding the signals. The baseband processor 1k-20 and the RF processor 1k-10 may transmit and receive signals as described above. As such, the baseband processor 1k-20 and the RF processor 1k-10 may also be called a transmitter, a receiver, a transceiver, a communicator, or a wireless communicator. The base station may transmit and receive signals to and from a UE by using the baseband processor 1k-20 and the RF processor 1k-10, and the signals transmitted to and received from the UE may include control information and data.

The communicator 1k-30 may provide an interface for communicating with other nodes in a network. The communicator 1k-30 may be a backhaul communicator. The communicator 1k-30 may convert a bitstream to be transmitted from a primary base station to another node, e.g., a secondary base station or a core network, into a physical signal, and convert a physical signal received from the other node, into a bitstream.

The storage 1k-40 may store data such as basic programs, application programs, and configuration information for operations of the base station. Specifically, the storage 1k-40 may store, for example, information about bearers assigned for a connected UE and measurement results reported from the connected UE. The storage 1k-40 may store criteria information used to determine whether to provide or release dual connectivity to or from the UE. The storage 1k-40 may provide the stored data upon request by the controller 1k-50. The storage 1k-40 may include any or a combination of storage media such as ROM, RAM, a hard disk, a CD-ROM, and a DVD. The storage 1k-40 may include a plurality of memories.

The controller 1k-50 may control overall operations of the base station. For example, the controller 1k-50 may transmit and receive signals through the baseband processor 1k-20 and the RF processor 1k-10, or through the communicator 1k-30. The controller 1k-50 records and reads data on or from the storage 1k-40. In this regard, the controller 1k-50 may include at least one processor. In addition, the controller 1k-50 may control the above-described base station to perform an RRC connection resume procedure with the UE. For example, the controller 1k-50 may control the other elements of the base station to transmit an RRCRelease message including suspendConfig information to the UE, receive an RRC resume request message from the UE, transmit a SCG-ConfigInfo message to another base station to enable the UE to apply MR-DC configuration, receive a SCG-Config message from the other base station, and transmit an RRCResume message to the UE. However, the controller 1k-50 is not limited thereto and may control the other elements of the base station to operate according to the afore-described embodiments of the disclosure. At least one element in the base station may be configured as one chip.

The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including random access memory (RAM) or flash memory, read only memory (ROM), electrically erasable programmable read only memory (EEPROM), a magnetic disc storage device, a compact disc (CD)-ROM, a digital versatile disc (DVD), another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). Such a storage device may access the electronic device via an external port. Furthermore, an additional storage device on the communication network may access the electronic device.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

The afore-described embodiments of the disclosure provide an apparatus and method capable of effectively providing services in a mobile communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of performing a radio resource control (RRC) connection resume procedure by a user equipment (UE), the method comprising:
   receiving an RRC release message comprising suspend configuration information;
   transiting to an RRC_INACTIVE mode based on the RRC release message;
   performing an RRC connection resume procedure with a first base station;
   receiving, from the first base station, an RRC resume message comprising secondary cell group (SCG) configuration information; and
   performing a random access procedure with a second base station based on the SCG configuration information;
   wherein the performing of the random access procedure with the second base station based on the SCG configuration information comprises performing the random access procedure based on an instruction of the first base station.

2. The method of claim 1, wherein the SCG configuration information is provided from the second base station.

3. The method of claim 1, wherein the performing of the random access procedure with the second base station based on the SCG configuration information comprises reporting failure of the random access procedure to the first base station by using a certain RRC message when the second base station is not found for a certain period of time and the random access procedure is not initiated.

4. The method of claim 1, wherein connection to the second base station is resumed by the random access procedure, the method further comprising:
   determining whether channel state information (CSI) of the second base station indicates out of range (OOR), or whether reference signal received power (RSRP) of a synchronization signal block (SSB) from the second base station is equal to or less than a certain reference value; and
   transmitting a measurement report message to the first base station based on a result of the determination.

5. The method of claim 4, wherein at least one of criterion information for determining whether the CSI indicates OOR or the certain reference value is included in the RRC resume message.

6. A method of performing a radio resource control (RRC) connection resume procedure by a first base station, the method comprising:
   transmitting an RRC release message comprising suspend configuration information;
   receiving an RRC resume request message from a user equipment (UE);
   transmitting, to a second base station, secondary cell group (SCG) configuration information for configuring multi-radio access technology-dual connectivity (MR-DC);
   receiving a SCG configuration message from the second base station;
   transmitting, to the UE based on the SCG configuration message, an RRC resume message comprising the SCG configuration information, and
   transmitting, to the UE, a message instructing the UE to perform a random access procedure with the second base station.

7. The method of claim 6, further comprising receiving, from the UE, a certain RRC message comprising information indicating that the second base station is not found for a certain period of time and the random access procedure fails.

8. The method of claim 6, further comprising receiving a measurement report message from the UE, wherein the measurement report message is received when channel state information (CSI) of the second base station indicates out of range (OOR) or when reference signal received power (RSRP) of a synchronization signal block (SSB) from the second base station is equal to or less than a certain reference value.

9. A user equipment (UE) for performing a radio resource control (RRC) connection resume procedure, the UE comprising:
   a transceiver; and
   a processor connected to the transceiver and configured to:
      receive an RRC release message comprising suspend configuration information,
      transit to an RRC_INACTIVE mode based on the RRC release message,
      perform an RRC connection resume procedure with a first base station,
      receive, from the first base station, an RRC resume message comprising secondary cell group (SCG) configuration information, and perform a random access procedure with a second base station based on the SCG configuration information,
wherein the processor is further configured to perform the random access procedure based on an instruction of the first base station.

10. The UE of claim 9, wherein the SCG configuration information is provided from the second base station.

11. The UE of claim 9, wherein the processor is further configured to report failure of the random access procedure to the first base station by using a certain RRC message when the second base station is not found for a certain period of time and the random access procedure is not initiated.

12. The UE of claim 9, wherein connection to the second base station is resumed by the random access procedure, and wherein the processor is further configured to:
   determine whether channel state information (CSI) of the second base station indicates out of range (OOR), or whether reference signal received power (RSRP) of a synchronization signal block (SSB) from the second base station is equal to or less than a certain reference value, and
   transmit a measurement report message to the first base station based on a result of the determination.

13. The UE of claim 12, wherein at least one of criterion information for determining whether the CSI indicates OOR or the certain reference value is included in the RRC resume message.

14. A first base station for performing a radio resource control (RRC) connection resume procedure, the first base station comprising:
   a transceiver; and
   a processor connected to the transceiver and configured to
      transmit an RRC release message comprising suspend configuration information,
      receive an RRC resume request message from a user equipment (UE),
      transmit, to a second base station, secondary cell group (SCG) configuration information for configuring multi-radio access technology-dual connectivity (MR-DC),
      receive a SCG configuration message from the second base station,
      transmit, to the UE based on the SCG configuration message, an RRC resume
   message comprising the SCG configuration information, and
      transmit, to the UE, a message instructing the UE to perform a random access procedure with the second base station.

15. The first base station of claim 14, wherein the processor is further configured to receive, from the UE, a certain RRC message comprising information indicating that the second base station is not found for a certain period of time and the random access procedure fails.

16. The first base station of claim 14, wherein the processor is further configured to receive a measurement report message from the UE, and
   wherein the measurement report message is received when channel state information (CSI) of the second base station indicates out of range (OOR) or when reference signal received power (RSRP) of a synchronization signal block (SSB) from the second base station is equal to or less than a certain reference value.

* * * * *